(12) United States Patent
Brodie et al.

(10) Patent No.: US 8,329,325 B2
(45) Date of Patent: Dec. 11, 2012

(54) BATTERY COOLING WITH MIST EVAPORATION AND CONDENSATION

(75) Inventors: Bradley Brodie, Milford, MI (US); Kwangtaek Hong, Ann Arbor, MI (US); Masafumi Kurata, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 295 days.

(21) Appl. No.: 12/708,056

(22) Filed: Feb. 18, 2010

(65) Prior Publication Data

US 2011/0200860 A1     Aug. 18, 2011

(51) Int. Cl.
*H01M 10/50*     (2006.01)

(52) U.S. Cl. ............................................. 429/62; 429/61

(58) Field of Classification Search ........................ None
See application file for complete search history.

(56) References Cited

U.S. PATENT DOCUMENTS

| | | | | |
|---|---|---|---|---|
| 4,350,026 | A | * 9/1982 | Klein | ............................... 62/333 |
| 6,889,515 | B2 | * 5/2005 | Tilton et al. | ................... 62/259.2 |
| 6,955,063 | B2 | 10/2005 | Adiga et al. | |

OTHER PUBLICATIONS

Bahadur, V., et al., Sch. of Mech. Eng., Purdue Univ., West Lafayette, IN, "Enhanced Cooling in a Sealed Cabinet Using an Evaporating-Condensing Dielectric Mist," paper presented at the 11th Intersociety Conference of Thermal and Thermomechanical Phenomena in Electronic Systems, 2008. ITHERM 2008, May 28-31, 2008, pp. 1191-1198.

\* cited by examiner

*Primary Examiner* — Cynthia Lee

(74) *Attorney, Agent, or Firm* — Harness, Dickey & Pierce, PLC

(57) ABSTRACT

A battery pack cooling system may utilize a shroud defining a throat and a body, which may contain a battery pack. An evaporator may be arranged against the battery pack. A liquid coolant delivery pipe may deliver liquid coolant from a reservoir to the throat section with the aid of gravity, a pump, or an ultrasonic misting device. A spray nozzle may also deliver liquid coolant into the throat. When in the throat, liquid coolant mixes with air blown by a fan. Gaps in the battery pack may align with gaps of the evaporator to permit liquid and air to be blown completely through the battery pack and through the evaporator. A refrigeration system including a refrigerant compressor, a condenser and an expansion device work to cool the evaporator to condense, cool and remove liquid coolant from the liquid and air mixture, and deposit it in the reservoir.

21 Claims, 2 Drawing Sheets

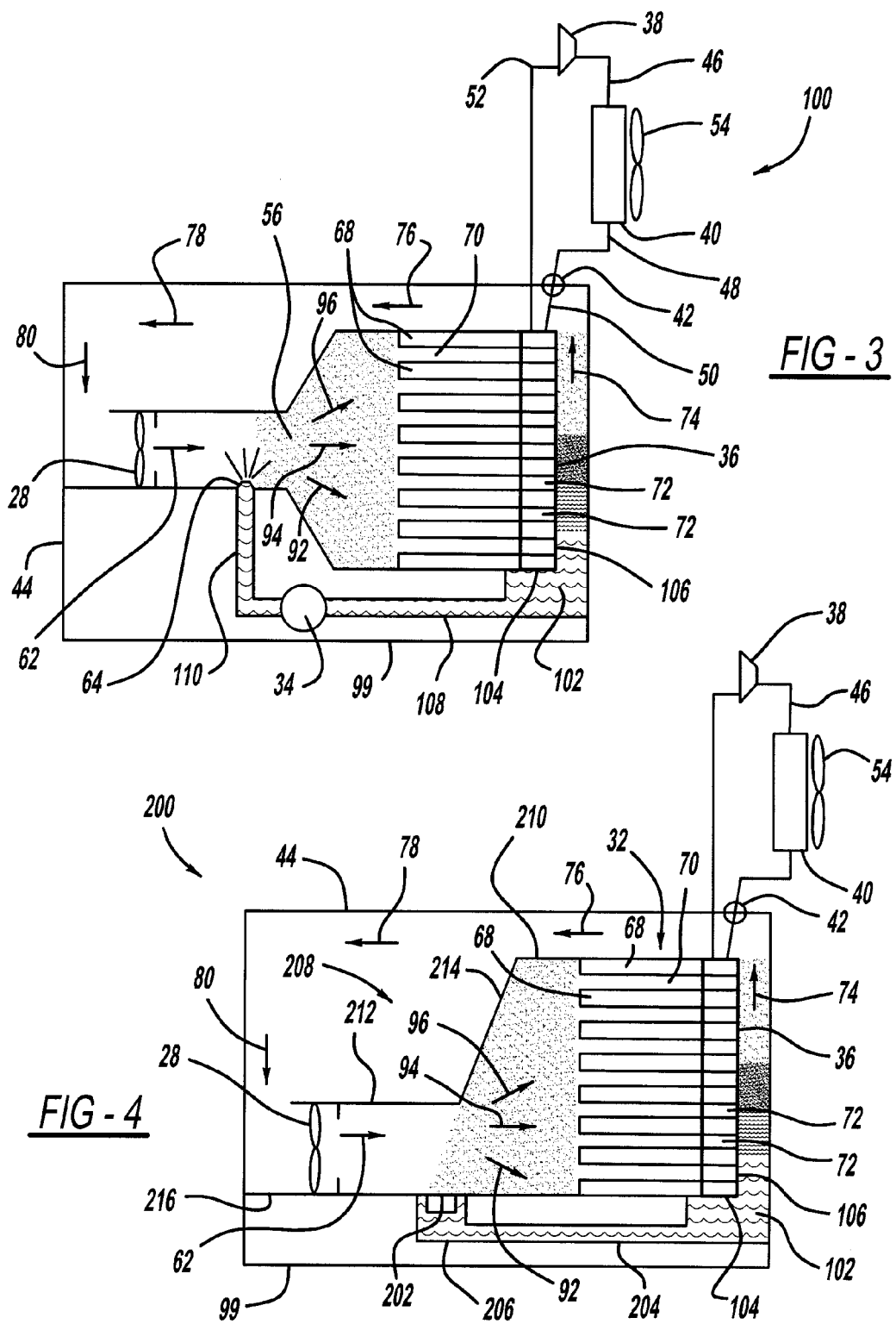

BATTERY COOLING WITH MIST EVAPORATION AND CONDENSATION

FIELD

The present disclosure relates to cooling a battery with a spray mist of a coolant.

BACKGROUND

This section provides background information, which is not necessarily prior art, related to the present disclosure. Modern vehicles, such as automobiles, may currently utilize battery packs to power electric motors to drive wheels of the vehicle. Such use of battery packs and electric motors is an effort to reduce the use of internal combustion engines, which may contribute to global warming by discharging excessive amounts of heat, and contribute to air pollution by discharging noxious combustion gases into the atmosphere. Using batteries to drive the vehicle is also done to reduce the use of oil and use a renewable energy source. However, such battery packs are not without their share of limitations. One limitation is the amount of electrical power that may be obtained from a battery pack depending upon the temperatures at which the battery pack is operating. Another limitation is the battery life that may be obtained from a battery pack, which is dependent upon the temperatures to which the battery pack is exposed. What is needed then is a device to maintain a battery pack within a predetermined temperature range to maximize not only the quantity of extractable electrical power from the battery pack, but also the useful life of the battery pack.

SUMMARY

This section provides a general summary of the disclosure, and is not a comprehensive disclosure of its full scope or all of its features. A battery pack cooling system may utilize a battery pack, a shroud that defines a throat section and a body section, which may contain the battery pack. The system may also utilize an evaporator arranged against the battery pack, a reservoir for capturing a liquid coolant, a liquid coolant delivery pipe having a first end and a second end, the first end open into the reservoir and a second end open into the throat section, and a liquid pump located within the liquid coolant delivery pipe to pump liquid coolant from the reservoir to the throat section. A spray nozzle attached to the second end of the liquid coolant delivery pipe. A fan for blowing air in the throat section, wherein the fan is located upstream of the second end of the liquid coolant delivery pipe.

The battery pack may further employ a plurality of separate battery cells. The plurality of separate battery cells define a plurality of gaps with one gap residing between each adjacent pair of separate battery cells. A refrigerant compressor, a refrigerant condenser and a refrigerant expansion device, like the evaporator, may be part of a refrigerant cycle to cool the evaporator. The battery pack cooling system may employ a housing and the battery pack, the shroud, the reservoir, the liquid coolant delivery pipe, the liquid pump, and the fan may be located within the housing. The compressor, condenser and expansion device may be located outside of the housing.

In another example, a battery pack cooling system may employ numerous separate battery cells that together form a battery pack. The individual battery cells may define a plurality of gaps, such as one gap between each adjacent or opposing pair of separate battery cells. A shroud may define a throat section and a body section, which may contain the battery pack. An evaporator may define gaps through an entire thickness dimension of the evaporator. A reservoir may be utilized for capturing a liquid coolant with the evaporator located between the battery pack and the reservoir. A liquid coolant delivery pipe may have a first end open into the reservoir and a second end open into the throat. The body section may have a larger cross-sectional diameter that the throat section. A liquid coolant pump may be located within the liquid coolant delivery pipe and pump liquid coolant from the reservoir and into the throat.

The evaporator may be arranged against the battery pack; however, an air gap may exist between and be formed by the reservoir and evaporator. A spray nozzle may be attached to the discharge end of the liquid coolant delivery pipe to spray liquid coolant directly into the throat. A fan for blowing air in the throat section, wherein the fan is located upstream of the second end of the liquid coolant delivery pipe. A refrigeration cycle may be formed in part by a refrigerant compressor, a refrigerant condenser, a refrigerant expansion device and the evaporator. The battery pack, the shroud, the reservoir, the liquid coolant delivery pipe, the liquid pump, the fan and the evaporator may be located within the housing while the compressor, condenser and expansion device may be located outside of the housing.

In yet another example, a battery pack cooling system may employ a plurality of separate battery cells forming a battery pack and defining a plurality of gaps with one gap residing between each adjacent pair of separate battery cells, a shroud defining a throat section and a body section with the battery pack residing within the body section. The system may also employ an evaporator defining a plurality of gaps through a thickness dimension of the evaporator, a reservoir for capturing a liquid coolant that passes through gaps of the battery pack and evaporator. The evaporator may be located between the battery pack and the reservoir. The system may further employ a liquid coolant delivery pipe with a first end open into the reservoir and a second end open into the throat. The body section may have a larger cross-sectional diameter that the throat section. Continuing, means for transferring liquid coolant from the liquid coolant reservoir to the throat may be utilized. Such means for transferring liquid coolant may be gravity flow through a pipe, a liquid pump, or an ultrasonic mist generator, for example.

The battery pack cooling system may further employ a housing such that the battery pack, the shroud, the reservoir, the liquid coolant delivery pipe, the liquid pump, and the fan may be located within the housing. A fan may be located in the throat of the shroud, and the housing and the shroud may define an airflow path therebetween to channel air from the evaporator to the fan. The evaporator may reside against the battery pack with the plurality of gaps of the evaporator aligning with the plurality of gaps of the battery pack to a degree to permit thru-flow of coolant-laden air. In addition to the evaporator, a refrigeration cycle may employ a refrigerant compressor, a refrigerant condenser, and a refrigerant expansion device. The refrigerant compressor, the refrigerant condenser, the refrigerant expansion device and the evaporator are components of a refrigeration cycle. The compressor, condenser and expansion device may be located outside of the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a diagram of a first embodiment of a battery pack and a battery pack cooling system; and FIG. 4 is a diagram of a first embodiment of a battery pack and a battery pack cooling system.

Corresponding reference numerals indicate corresponding parts throughout the several views of the drawings.

DETAILED DESCRIPTION

Figure 1:
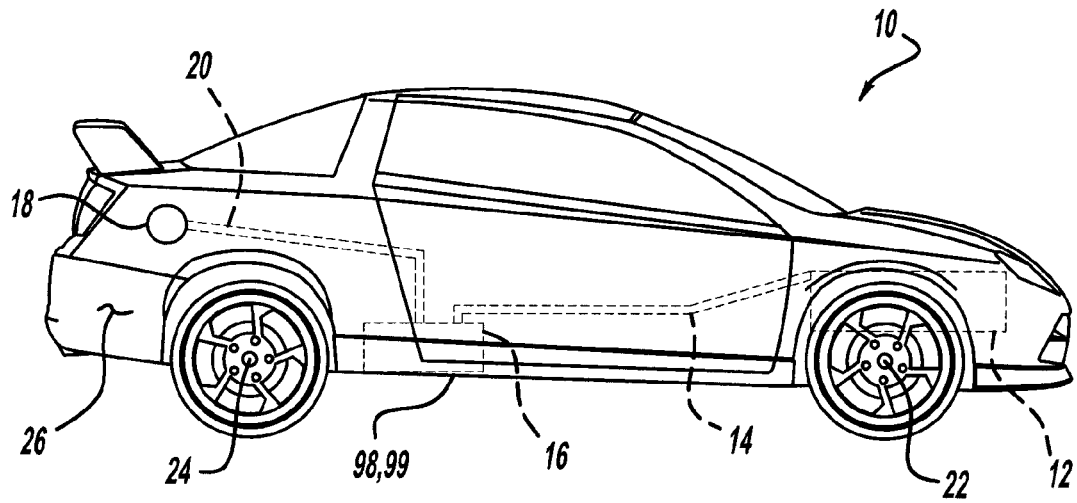
FIG. 1 is a side view of a vehicle depicting representative locations of an engine, a battery pack, and a battery pack cooling system.

Example embodiments will now be described more fully with reference to FIGS. 1-4 of the accompanying drawings. FIG. 1 depicts a vehicle 10, which may be an automobile, having an engine 12, an electricity supply wire 14, a battery pack cooling system 16, an electrical plug 18, and electricity supply wire 20. FIG. 1 depicts a general location of battery pack cooling system 16; however, battery pack cooling system 16 may be located anywhere in the vehicle meeting packaging and heat transfer requirements. For instance, battery pack cooling system 16 may be located between a front wheel hub 22 and a rear wheel hub 24, or battery pack cooling system 16 may be located over rear wheel hub 24 or even in a rear section 26 of vehicle 10, such as behind rear wheel hub 24, or a combination or overlap of such locations.

Figure 2:
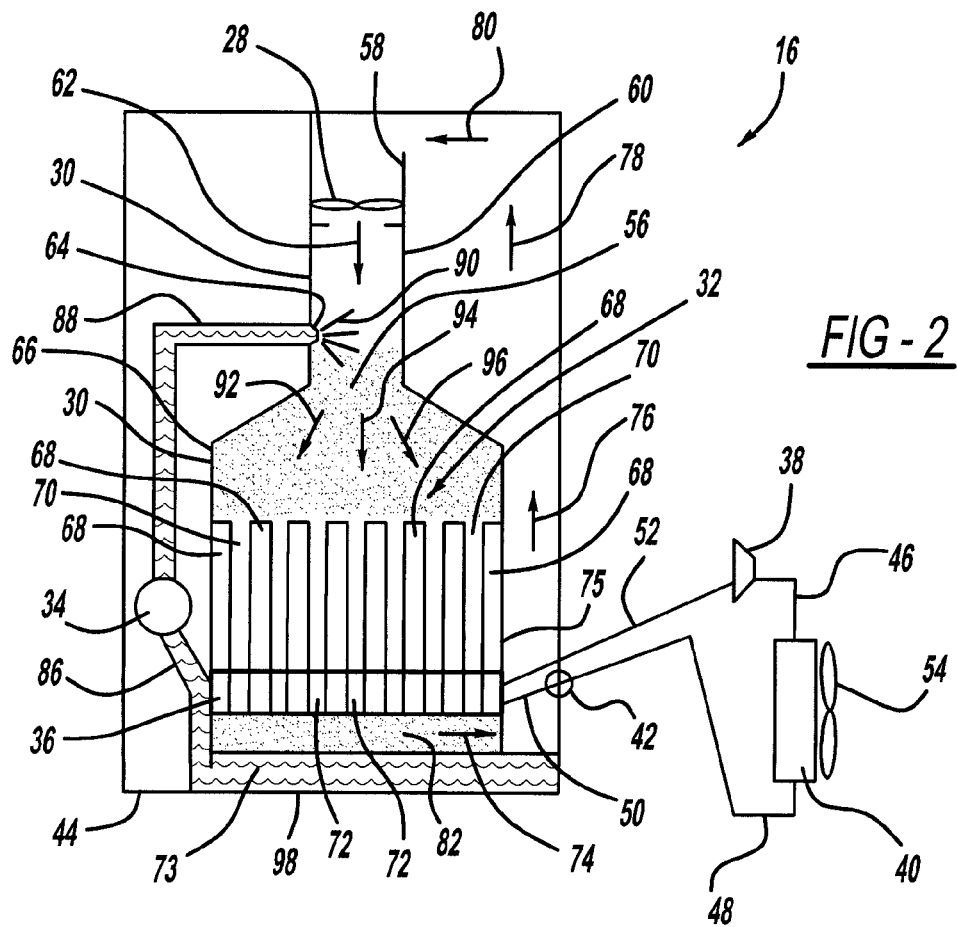
FIG. 2 is a diagram of a first embodiment of a battery pack and a battery pack cooling system.

Turning now primarily to FIG. 2, battery pack cooling system 16 is depicted and may employ a fan 28, such as an electrically driven fan, to propel or force air 38 through multiple sections of a shroud 30. For instance, fan 28 may be located in a throat section of shroud 30 that may be smaller in cross-sectional area than a larger section of shroud 30 that may contain a battery pack 32. Shroud 30 may be a type of metal or plastic housing that channels air toward battery pack 32, which may be a collection or assembly of individual lithium-ion type of battery cells, which may be wired in series or parallel depending upon voltage and current draw requirements. Shroud 30, fan 28, and battery cells 32 may work in conjunction with further devices to generate a chilled or cool, misting spray that may be introduced into air 62 that is forced through shroud 30 by fan 28. More specifically, battery pack cooling system 16 may further employ a positive displacement vane pump 34, which may simply be referred to as pump 34, an evaporator 36, a compressor 38, a condenser 40, an expansion device 42, a coolant reservoir 73, coolant piping 86, 88, a spray nozzle 64, and a housing or casing 44.

More specifically, compressor 38, condenser 40, expansion device 42 and evaporator 36 may operate similar to other cooling or refrigeration cycles to the extent that a refrigerant, such as R-134 as an example, may be circulated from compressor 32, which compresses the refrigerant into a high temperature vapor state, which then travels via a pipe 46 to a condenser 40, where a fan 54 may blow air through, that is over an exterior of, condenser 40 to remove heat. Upon exiting condenser 40, liquid refrigerant may flow through a pipe 48 to expansion device 42 to change the phase of the expanding refrigerant from a liquid phase to a gas phase. As the liquid refrigerant changes to a gaseous phase and evaporates inside the evaporator, the evaporator extracts heat from the air around it which is needed to separate the molecules of the fluid from a liquid to a gas. Evaporator 36 may have metal fins to help in exchange of the thermal energy with the surrounding air. When the refrigerant leaves evaporator 36, it is a cool, low pressure gas which may cause evaporator 36 to become colder than the exterior air surrounding it. Upon passing through interior of evaporator 36, gaseous phase refrigerant of the refrigeration cycle then passes into pipe 52 before flowing to compressor 38, where the refrigeration cycle continues with compression of the refrigerant. Pipes 46, 48, 50, 52 and refrigeration cycle components or devices 36, 38, 40, 42 may be full of refrigerant at all times.

A mixture of air and fluid 56 forced through shroud 30 by fan 28 may pass over exterior surfaces of evaporator 36, that is, air and fluid 56 may pass through gaps 72 in the overall thickness or width of evaporator 36. More specifically, during operation of battery pack cooling system 16, air may enter shroud 30 at a shroud entrance 58 upon being drawn by fan 28. Airflow represented by arrow 62 may immediately pass through fan 28 and enter a shroud throat 60, which may be narrower than other portions of shroud 30 and contain fan 28. Air may proceed through shroud throat 60 and pass spray nozzle 64, which may be located in a wall of throat 60 and spray liquid coolant into throat 60 to mix with passing air represented by arrow 62 to form mixture of air and fluid 56. Upon mixture of air and fluid 56 being formed, the mixture may then pass into an expanded portion 66 of shroud 30. Shroud expanded portion 66 may have a larger cross sectional area than cross-sectional area of throat 60. Shroud expanded portion 66 may contain battery pack 32, which may be an arrangement of individual lithium ion battery cells 68, such as one battery cell 68 arranged next to another battery cell 68, such as in a parallel fashion with a gap 70 defined between opposing faces or surfaces of a pair of individual battery cells 68.

With gaps 70 between adjacent battery cells 68, mixture of air and coolant 56 may flow or pass through gaps 70 to remove heat radiating from or expelled by battery cells 68 into gap 70. Moreover, mixture of air and coolant 56 may be deposited directly on individual battery cells 68 to absorb heat from battery cells 68. When deposited onto individual surfaces of battery cells 68, such as surfaces that face each other and thereby define gaps 70, mixture of air and coolant 56 may have an evaporative cooling effect and thereby remove heat faster than if only air were passed over the same surfaces of battery cells 68 at the same velocity. Still yet, mixture of air and coolant 56 may be supplied through gaps 70 at such a mass flow rate that liquid coolant of mixture of air and coolant 56 may run or drip from such surfaces, thereby removing heat.

With continued reference to FIG. 2, mixture of air and coolant 56 passes through gaps 70 and then passes through gaps 72 in evaporator 36. Gaps 70 and gaps 72 may be aligned or partially aligned to facilitate flow of mixture of air and coolant 56. Evaporator 36 may be arranged directly against battery pack 32 or with a relatively small gap between evaporator 36 and battery pack 32. Evaporator 36 may be the same or similar to an evaporator of a traditional air-conditioning system with adjustments in size for packaging requirements. Because evaporator 36 is cooled by a refrigeration cycle to a lower temperature than any other component of battery pack cooling system 16, mixture of air and coolant 56 becomes lower in temperature as it passes through evaporator 36. Thus, heat is removed from battery pack 32 by mixture of air and coolant 56 and then upon mixture of air and coolant 56 passing through evaporator 36, mixture of air and coolant 56 is cooled and subsequently deposited into coolant fluid reservoir 73. Space or volume 82 located between evaporator 36 and reservoir 73 is a flowing mixture of air and liquid coolant moving away from evaporator 36 and toward reservoir 73 and is also a point of separation of mixture of air and coolant. Thus, reservoir 73 is a collection location of liquid coolant while air resident in mixture of air and coolant exiting evaporator 36 flows in accordance with progression of arrow 74, arrow 76, arrow 78 and arrow 80, before such air passes once again, through fan 28 in accordance with arrow 62. To retain and guide air from volume 82 to an interior of shroud 30, battery pack cooling system 16 may utilize a housing 44 and exterior surface 75 of shroud 30. Housing 44 may also form a boundary of coolant reservoir 73.

After mixture of air and coolant in volume 82 separates into liquid that is collected in reservoir 73, and air that is returned to fan 28, a pump 34, such as a positive displacement vain pump, sucks or draws liquid coolant from reservoir 73 into an intake pipe 86 through pump 34 and into a feeder pipe 88, which is pressurized in accordance with pumping capabilities of pump 34. intake pipe 86 and feeder pipe 88 may be referred to as a liquid coolant delivery pipe with a first end open into reservoir 73 and second end open into throat 60. Fan 28 may be located upstream of second end of liquid coolant delivery pipe 86, 88. Liquid coolant within feeder pipe 88 then flows to spray nozzle 64, where pressurized liquid coolant may be atomized into relatively small droplets and sprayed as a mist 90 into shroud throat 60 to mix with air represented by arrow 62 form mixture of air and fluid 56. An advantage of spraying mist 90 of liquid coolant into a narrow throat 60 and then permitting mixture of air and fluid 56 to expand downstream is that mist 90 may be sprayed or mixed into passing, flowing air at spray nozzle 64 in an area of shroud 30 that is of comparatively small cross section than expanded portion of shroud, thereby ensuring an equal and thoroughly combined mixture of air and liquid coolant because of a smaller cross-section within which to mix, before expanding into expanded portion of shroud 30. Thus, upstream of spray nozzle 64, only air flows as represented by arrow 62, and downstream of spray nozzle 64, only mixture of air and coolant 56 flows, as represented by arrows 92, 94, 96.

In order to physically contain the volume of air and the volume of liquid coolant, or their combination, utilized by battery pack cooling system 16, portions of, or all of, battery pack cooling system 16 may be contained within housing 44. That is, housing 44 may act as an airtight and liquid-tight seal for fluids (gas and liquids) within housing 44. Pipes 48, 52 may pass through housing 44 as may other inlet or outlet pipes, such as for electrical wires and create a seal with housing 44.

FIG. 3 depicts an orientation of battery pack cooling system 16 such that a side 99 of housing of battery pack cooling system 16 corresponds to a bottom side 98 in FIG. 2. Battery pack 32, shroud 30, reservoir 102, liquid coolant delivery pipe 86, 88, pump 34 and fan 28 may be located within housing 44. Compressor 38, condenser 40, and expansion device 42 may be located outside housing 44. Pipe 48 between condenser 40 and expansion device 42 and pipe 52 between compressor 38 and evaporator 36 may pass through a wall defining housing 44. Other orientations and variations of the embodiment of FIG. 2 are possible, as will be explained in conjunction with FIG. 3.

FIG. 3 depicts a second embodiment of a battery pack cooling system 100 that is similar to battery pack cooling system 16 of FIG. 2. FIG. 3 depicts a different orientation of battery pack cooling system 100 such that coolant reservoir 102 may be oriented or located around a corner of evaporator 36. More specifically, coolant reservoir 102 may be located along a short side 104 (i.e. the thickness) of evaporator 36 and along a long side 106 of evaporator 36 relative to depiction of evaporator 36 in FIG. 3. An advantage of the arrangement depicted in FIG. 3 is that mixture of air and coolant 56 that flows through battery pack 32 and then evaporator 36, and subsequently exits evaporator 36 along long side 106 of evaporator will be separated naturally. That is, liquid coolant fluid will fall into fluid reservoir 102 due to gravity while cooled air, represented by arrow 74, will flow between housing 44 and evaporator 36 so that it may be drawn back into fan 28 in accordance with air path represented by arrows 74, 76, 78, 80. Thus, battery pack cooling system 100 depicted in FIG. 3 may provided an advantage in separating air from liquid coolant after discharge from evaporator by utilizing gravity. Additionally, because individual battery cells 68 have a longitudinal length that is oriented horizontally, as opposed to a longitudinal length that is oriented vertically as in FIG. 2, vehicle packaging requirements, such as within vehicle 10, may be met.

Because of the horizontal orientation of battery pack cooling system 100, and horizontal orientation of intake pipe 108, pump 34 may be of a smaller size or capacity in terms of sucking or drawing force. Because liquid coolant within pump intake pipe 108 is able to benefit from the advantage of gravity flow; that is, liquid coolant may naturally flow through pump intake pipe 108 and into pump 34, a lower horsepower pump may be necessary than if pump 34 is required to lift or elevate liquid, as may be necessary for pump 34 of battery pack cooling system 16 of FIG. 2. Thus, with the orientation of FIG. 3, pump 34 may have a shorter distance to pump liquid coolant against the force of liquid coolant in feeder pipe 110 due to gravity. Additionally, because of orientation of battery pack cooling system 100, feeder pipe 110 may be made shorter than feeder pipe 88 of FIG. 2, thereby taking advantage of gravity flow in intake pipe 108 and placing pump 34 as close as possible to vertically oriented feeder pipe 110. Bottom side 99 of housing 44 of embodiment of battery pack cooling system 100 may be oriented as depicted in FIG. 1.

Turning now to FIG. 4, another embodiment of battery pack cooling system 200 is depicted. More specifically, instead of a pump 34 to pump or propel liquid coolant at a high pressure through a feeder pipe en route to a spray nozzle, as depicted in the embodiments of FIGS. 2 and 3, an ultrasonic mist generator 202 may be utilized. Ultrasonic mist generator 202 may employ a diaphragm, such as a metal diaphragm for example, that vibrates at a prescribed frequency to nebulize or atomize liquid coolant so that it mixes well with air of airflow represented by arrow 62. Operation of ultrasonic mist generator 202 may be above the frequencies of audible sound, such as any frequency over 20000 Hertz (Hz). Thus, an advantage of utilizing ultrasonic mist generator 202 may be its virtually silent operation, which may be a benefit to passengers within an interior of a vehicle employing battery pack cooling system 200. Bottom side 99 of housing 44 may reside as depicted in FIG. 1 such that liquid coolant resident within coolant reservoir 102 may be efficiently supplied through liquid coolant supply pipe 204 to ultrasonic mist generator 202. More specifically, when housing 44 is resident in its installed position within vehicle 10, bottom side 99 of housing 44 may be parallel or approximately parallel to a level road surface upon which wheels of vehicle 10 rests. Similarly, liquid coolant supply pipe 204 may be parallel or approximately parallel to a level road surface upon which wheels of vehicle 10 rests. Thus, force created by the acceleration of gravity on a total height of liquid coolant in liquid coolant reservoir 102 (between evaporator 36 and housing 44) causes liquid coolant passing through gaps 72 of evaporator 36 to pass through liquid coolant supply pipe 204 en route to an ultrasonic mist generator reservoir 206, which may be resident below and/or around ultrasonic mist generator 202 to supply ultrasonic mist generator 202 with liquid coolant.

Upon liquid coolant being discharged from ultrasonic mist generator 202 and into airflow represented by arrow 62, mixture of air and coolant 56 flows downstream of ultrasonic mist generator 202, as represented by arrows 92, 94, 96 and then flows through gaps 70 between individual battery cells 68 of battery pack 32. The liquid coolant may vaporize as it absorbs heat when passing through battery pack 32. A shroud 208 may have a large shroud portion 210, which may contain battery pack 32, and a throat portion 212, which may contain fan 28. A straight, flat shroud portion 214 of shroud 208 may link or connect large shroud portion 210 and throat portion 212 to create a gradual expansion from an ending of throat portion 212 to a beginning of large shroud portion 210. Large shroud portion 210 may have a larger cross-sectional area than a cross-sectional area of throat portion 212. Shroud 208 may have a bottom side 216, which may be completely straight with no bends or curves. An advantage of such an arrangement is that liquid coolant may be gravity fed to ultrasonic mist generator 202 so that liquid coolant does not have to be pumped to a higher elevation as in the embodiments of FIGS. 2 and 3.

The teachings of the present disclosure present battery pack cooling system 16, 100, 200 that is closed and not open to the atmosphere to prevent evaporation of the liquid coolant and contamination from the outside environment. The battery may be cooled by airflow alone, without spray injection or mist of liquid coolant, up to a predetermined temperature, at which time pump 34 or ultrasonic mist generator 202 may be invoked to hasten cooling or rather hasten heat transfer from battery pack 32.

A liquid coolant, as discussed above, that may possess properties to provide acceptable cooling to battery pack 32, as presented above, may be a liquid coolant manufactured by 3M, such as Novec 7000. Such a liquid coolant may provide acceptable dielectric properties and a boiling point of 34 degrees Celsius (C.), which is in a desired operational temperature range of battery pack 32, which may be 15 C to 35 C, inclusive. Use of battery pack 32 in a hybrid-electric vehicle may require a liquid coolant to have a boiling point that is equal to or just below the highest desired operational temperature of battery pack 32. The teachings of the present disclosure are applicable to a battery pack of a hybrid vehicle, a dedicated electric vehicle, or a plug-in hybrid-electric vehicle, as depicted in FIG. 1.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A battery pack cooling system comprising:
   a battery pack;
   a shroud that defines a throat section and a body section, the body section containing the battery pack;
   an evaporator arranged against the battery pack;
   a reservoir for capturing a liquid coolant;
   a liquid coolant delivery pipe having a first end and a second end, the first end open into the reservoir and a second end open into the throat section; and
   a liquid pump located within the liquid coolant delivery pipe to pump liquid coolant from the reservoir to the throat section;
   a spray nozzle attached to the second end of the liquid coolant delivery pipe; and
   a fan for blowing air in the throat section, wherein the fan is located upstream of the second end of the liquid coolant delivery pipe.

2. The battery pack cooling system of claim 1, wherein the battery pack further comprises a plurality of separate battery cells.

3. The battery pack cooling system of claim 2, wherein the plurality of the separate battery cells define a plurality of gaps with one gap residing between each of the separate battery cells.

4. The battery pack cooling system of claim 3, further comprising:
   a refrigerant compressor;
   a refrigerant condenser; and a refrigerant expansion device, wherein the refrigerant compressor, the refrigerant condenser, the refrigerant expansion device and the evaporator are part of a refrigerant cycle.

5. The battery pack cooling system of claim 4, further comprising a housing, wherein the battery pack, the shroud, the reservoir, the liquid coolant delivery pipe, the liquid pump, and the fan are located within the housing.

6. The battery pack cooling system of claim 5, wherein the compressor, the condenser and the expansion device are located outside of the housing.

7. A battery pack cooling system comprising:
a plurality of separate battery cells forming a battery pack and defining a plurality of gaps with one gap residing between each adjacent pair of separate battery cells;
a shroud that defines a throat section and a body section, the battery pack residing within the body section;
an evaporator defining gaps through a thickness dimension of the evaporator;
a reservoir for capturing a liquid coolant, wherein the evaporator is located between the battery pack and the reservoir;
a liquid coolant delivery pipe having a first end and a second end, the first end open into the reservoir and a second end open into the throat, the body section having a larger cross-sectional diameter that the throat section; and
a liquid coolant pump located within the liquid coolant delivery pipe, the liquid pump for pumping liquid coolant from the reservoir to the throat.

8. The battery pack cooling system of claim 7, wherein the evaporator is arranged against the battery pack.

9. The battery pack cooling system of claim 7, wherein between the reservoir and the evaporator, an air gap is defined.

10. The battery pack cooling system of claim 7, further comprising:
a spray nozzle attached to the second end of the liquid coolant delivery pipe to spray liquid coolant into the throat.

11. The battery pack cooling system of claim 7, further comprising:
a fan for blowing air in the throat section, wherein the fan is located upstream of the second end of the liquid coolant delivery pipe.

12. The battery pack cooling system of claim 7, further comprising:
a refrigerant compressor;
a refrigerant condenser; and
a refrigerant expansion device, wherein the refrigerant compressor, the refrigerant condenser, the refrigerant expansion device and the evaporator are part of a refrigeration cycle.

13. The battery pack cooling system of claim 12, further comprising a housing, wherein the battery pack, the shroud, the reservoir, the liquid coolant delivery pipe and the liquid coolant pump are located within the housing.

14. The battery pack cooling system of claim 13, wherein the compressor, the condenser and the expansion refrigerant device are located outside of the housing.

15. A battery pack cooling system comprising:
a plurality of separate battery cells forming a battery pack and defining a plurality of gaps with one gap residing between each adjacent pair of separate battery cells;
a shroud defining a throat section and a body section, the battery pack residing within the body section;
an evaporator defining a plurality of gaps through a thickness dimension of the evaporator;
a reservoir for capturing a liquid coolant, wherein the evaporator is located between the battery pack and the reservoir;
a liquid coolant delivery pipe having a first end and a second end, the first end open into the reservoir and the second end open into the throat, the body section having a larger cross-sectional diameter that the throat section; and
means for transferring liquid coolant from the liquid coolant reservoir to the throat.

16. The battery pack cooling system of claim 15, wherein the transferring means is an ultrasonic mist generator.

17. The battery pack cooling system of claim 15, further comprising a housing,
a liquid pump; and
a fan;
wherein the battery pack, the shroud, the reservoir, the liquid coolant delivery pipe, the liquid pump, and the fan are located within the housing.

18. The battery pack cooling system of claim 17, wherein:
the fan is located in the throat of the shroud, and wherein the housing and the shroud define an airflow path to channel air from the evaporator to the fan.

19. The battery pack cooling system of claim 18, wherein the evaporator resides against the battery pack and the plurality of gaps of the evaporator align with the plurality of gaps of the battery pack.

20. The battery pack cooling system of claim 19, further comprising:
a refrigerant compressor;
a refrigerant condenser; and
a refrigerant expansion device, wherein the refrigerant compressor, the refrigerant condenser, the refrigerant expansion device and the evaporator are components of a refrigeration cycle.

21. The battery pack cooling system of claim 20, wherein the compressor, the condenser and the expansion device are located outside of the housing.

* * * * *

UNITED STATES PATENT AND TRADEMARK OFFICE
CERTIFICATE OF CORRECTION

Page 1 of 1

PATENT NO. : 8,329,325 B2
APPLICATION NO. : 12/708056
DATED : December 11, 2012
INVENTOR(S) : Bradley Brodie et al.

It is certified that error appears in the above-identified patent and that said Letters Patent is hereby corrected as shown below:

Col. 2, line 6, replace "that" with --than--
Col. 2, line 39, replace "that" with --than--
Col. 5, line 20, replace "intake" with --Intake--
Col. 6, line 13, replace "provided" with --provide--
Col. 9, line 26, claim 7, replace "that" with --than--
Col. 10, line 20, claim 15, replace "that" with --than--

Signed and Sealed this
Nineteenth Day of February, 2013

Teresa Stanek Rea
*Acting Director of the United States Patent and Trademark Office*